United States Patent [19]
Furukawa et al.

[11] Patent Number: 5,294,499
[45] Date of Patent: Mar. 15, 1994

[54] NON-AQUEOUS SECONDARY CELL

[75] Inventors: Nobuhiro Furukawa, Hirakata; Toshiyuki Nohma, Kadoma; Yuji Yamamoto, Osaka, all of Japan

[73] Assignee: Sanyo Electric Co., Ltd., Moriguchi, Japan

[21] Appl. No.: 960,217

[22] Filed: Oct. 13, 1992

Related U.S. Application Data

[63] Continuation of Ser. No. 564,003, Aug. 7, 1990, abandoned.

[30] Foreign Application Priority Data

Aug. 15, 1989 [JP] Japan ................. 1-210477
Jan. 18, 1990 [JP] Japan ................. 2-10196

[51] Int. Cl.$^5$ .................. H01M 2/02; H01M 6/08
[52] U.S. Cl. .................... 429/164; 429/224
[58] Field of Search ............ 429/164, 224; 204/96

[56] References Cited

U.S. PATENT DOCUMENTS

| | | | |
|---|---|---|---|
| 4,585,718 | 4/1986 | Uedaira et al. | 429/224 |
| 4,590,059 | 5/1986 | Mellors | 423/605 |
| 4,758,484 | 7/1988 | Furukawa et al. | 429/194 |
| 4,863,817 | 9/1989 | Ogino et al. | 429/194 |
| 4,904,552 | 2/1990 | Furukawa et al. | 429/197 |
| 4,975,346 | 12/1990 | Lecerf et al. | 429/197 |

FOREIGN PATENT DOCUMENTS 63-114064 5/1988 Japan.

OTHER PUBLICATIONS

"Manganese Oxides for Lithium Secondary Battery", Furukawa et al., Proceedings of the Symposium on Primary and Secondary Ambient Temperature Lithium Batteries, Oct. 1987, vol. 88–6, pp. 557–564.
JP-A-1 296 568, Patent Abstracts of Japan, vol. 140, No. 85 (E-890), Feb. 16, 1990.
JP-A-1 274 359, Patent Abstracts of Japan, vol. 14, No. 41 (E-879), Jan. 25, 1990.

*Primary Examiner*—Karl Group
*Assistant Examiner*—A. Wright
*Attorney, Agent, or Firm*—Armstrong, Westerman, Hattori, McLeland & Naughton

[57] ABSTRACT

A rechargeable non-aqueous secondary cell comprising a negative electrode; a positive electrode comprising a lithium containing manganese oxide as its active material, wherein the positive electrode has a specific surface area measured by the BET method of 9.0 $m^2/g$ to 67.5 $m^2/g$; and a separator interposed between the positive and the negative electrodes which is impregnated with a non-aqueous electrolyte. A rechargeable non-aqueous secondary cell comprising a negative electrode; a positive electrode comprising a lithium containing manganese oxide as its active material, which has grain sizes of substantially 20 $\mu m$ or less, when observed by a scanning electron microscope; and a separator interposed between the positive and said negative electrodes impregnated with a non-aqueous electrolyte.

7 Claims, 8 Drawing Sheets

NON-AQUEOUS SECONDARY CELL

This application is a continuation division of application Ser. No. 564,003 field Aug. 7, 1990 now abandoned.

BACKGROUND OF THE INVENTION

(1) Field of the Invention

This invention relates to a non-aqueous secondary cell comprising a negative electrode having lithium as an active material and a positive electrode having a lithium-including manganese oxide as an active material, especially to an improvement of the positive electrode.

(2) Description of the Prior Art

As an active material of the positive electrode of this kind of secondary cell, molybdenum trioxide, vanadium pentoxide and sulfide of titanium or niobium have been proposed and partially practically used into practical use.

As an active material of a positive electrode of a non-aqueous primary cell, manganese dioxide and carbon fluoride are known and have already been put into practical use. Especially, manganese dioxide is excellent in storage characteristics, abundant, and inexpensive.

Considering these features, manganese dioxide seems to be appropriate as an active material of the positive electrode of a non-aqueous secondary cell. However, manganese dioxide is poor in reversibility and charge/discharge cycle characteristic.

The inventors of this invention has disclosed a proposal for minimizing the above problems of manganese dioxide in U.S. Pat. No. 4,758,484 (Japanese Patent Publication Kokai No. 63-114064). According to the above patent, a lithium-including manganese oxide, namely, a manganese dioxide including $Li_2MnO_3$, or a manganese oxide including lithium and having CuK$\alpha$ beam peaks at $2\theta = 22°$, $31.5°$, $37°$, $42°$ and $55°$ is employed as a positive electrode active material. As a lithium-including manganese oxide, $Li_{1-x}Mn_2O_4$ ($1 > x > 0$) has been disclosed in U.S. Pat. No. 4,904,552.

According to the above proposal, the crystal lattice structure of the manganese oxide has reversibility with respect to the insertion and removal of lithium ion, which improves the cycle characteristic. However, other characteristics should also be improved to put it into practical use.

Although discharging manganese dioxide electrochemically has been proposed as a method of producing a lithium-including manganese oxide, it is more practical to mix a lithium salt and a manganese oxide and then to heat-treat the mixture. However, such a reaction between solid phases is performed non-uniformly if the manganese oxide mixed with the lithium salt has large-sized grains. As a result, a large portion of the above two chemicals remain unreacted, which prevents improvement in the cycle characteristic.

SUMMARY OF THE INVENTION

Accordingly, this invention has a first object of offering a non-aqueous secondary cell having improved cycle characteristic.

A second object of this invention is to offer a non-aqueous secondary cell having increased discharge capacity.

A third object of this invention is to offer a non-aqueous secondary cell which can have improved resistance against overcharge.

The above objects are fulfilled by a rechargeable non-aqueous secondary cell comprising a negative electrode; a positive electrode comprising a lithium-including manganese oxide as an active material, the lithium-including manganese oxide having a specific surface area measured by the BET method of 9.0 $m^2/g$ to 67.5 $m^2/g$; and a separator interposed between the positive which is said negative electrodes and impregnated with a non-aqueous electrolyte.

The lithium-including manganese oxide may have grain sizes of substantially 20 $\mu m$ or less when observed by a scanning electron microscope.

The above objects are also fulfilled by a rechargeable non-aqueous secondary cell comprising a negative electrode; a positive electrode comprising a lithium-including manganese oxide as an active material, grain sizes of which are substantially 20 $\mu m$ or less when observed by a scanning electron microscope; and a separator interposed between the positive and the negative electrodes.

The lithium-including manganese oxide may have a specific surface area measured by the BET method of 9.0 $m^2/g$ to 67.5 $m^2/g$.

The lithium-including manganese oxide may be obtained from manganese dioxide and lithium hydroxide and the specific surface area of the lithium-including manganese oxide is determine (controlled) by a specific surface area of the manganese dioxide.

The lithium-including manganese oxide may be obtained from manganese dioxide and lithium hydroxide and the specific surface area of the lithium-including manganese oxide is a function of the mixing ratio of the manganese dioxide and the lithium hydroxide.

The lithium-including manganese oxide may be obtained from manganese dioxide and lithium hydroxide and the specific surface area of the lithium-including manganese oxide is a function of the temperature at which a mixture of the manganese dioxide and the lithium hydroxide is heat treated.

The negative electrode may be formed of either lithium or a lithium alloy.

The electrolyte may be formed of a mixture of propylene carbonate and dimethoxyethane to which has been added 1 mol/l of lithium perchlorate.

The above constructions fulfill the above objects for the following reasons.

a) A lithium-including manganese oxide is obtained by mixing a lithium salt and a manganese dioxide and heat-treating the mixture. The obtained lithium-including manganese oxide has a smaller specific surface area than that of the starting manganese dioxide along. This is because porosity of the manganese dioxide is lowered taking lithium into its crystal lattice structure. The specific surface area of the obtained lithium-including manganese oxide depends on what kind of manganese oxide was used, the percentage of lithium included, and the heat-treating temperature.

If the specific surface area of the obtained lithium-including manganese oxide is too small, a contacting area with the electrolyte is small and so the utilization of the manganese oxide as an active material is low, resulting in a small discharge capacity. If the specific surface area is too large, the electrolyte is decomposed during charging due to the high chemical catalytic activity of the mangane oxide. Then, gas is generated by the decomposition of the electrolyte, whereby the cell is expanded. Also, drying out of the electrolyte increases the cell internal resistance, which is conspicuous after the cell is overcharged.

If the specific surface area of the lithium-including manganese oxide measured by the BET method is restricted to between 9.0 m$^2$/g and 67.5 m$^2$/g as in the above constructions, advantages of including lithium such as improving the charge/discharge cycle characteristic, discharge capacity and resistance against overcharge, are realized.

b) In order to produce a lithium-including manganese oxide whose grain sizes are small, the grain sizes of the manganese oxide, in the state of being mixed with lithium salts, should be decreased. In this way, the lithium salt and the manganese oxide are reacted uniformly, which leaves no substantially portion of the lithium-including manganese oxide unreacted.

Even if the grain sizes of the lithium-including manganese oxide are more than 20 μm when the oxide is produced, it is adeptable if the grain sizes are kept at substantially 20 μm or less before heat-treating the positive electrode material. With the grain sizes being kept at substantially 20 μm or less, the distribution state of lithium is changed, thereby eliminating the unreacted portion of the lithium-including manganese oxide. Practically, the distribution of lithium is uniform in the manganese solid phase. As a result, prevention of lithium movement during charging or discharging is restricted and so the cycle characteristic is improved.

BRIEF DESCRIPTION OF THE DRAWINGS

These and other objects, advantages and features of the invention will become apparent form the following description thereof taken in conjunction with the accompanying drawings which illustrate specific embodiments of the invention. In the drawings.

DESCRIPTION OF THE PREFERRED EMBODIMENTS

Embodiment I

Figure 1:
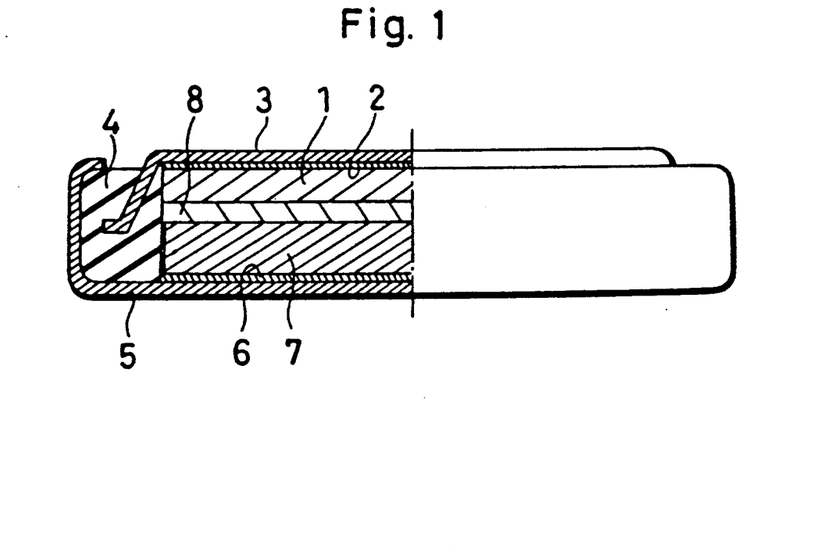
FIG. 1 is a cross sectional view of a non-aqueous secondary cell.

An embodiment according to this invention will be described referring to FIG. 1. Lithium-including manganese oxides having different specific surface areas were produced using different kinds of manganese oxides that is maganese oxides (having different specific surface areas).

Example I According To This Invention

A negative electrode 1 formed of a lithium metal is pressure-adhered on an inner surface of a negative electrode collector 2, and the negative electrode collector 2 is adhered on an inner surface of a negative can 3 formed of stainless steel. A peripheral portion of the can 3 is fixed in an insulating packing 4 of polypropylene, and a positive can 5 formed of stainless steel is fixed around an outer periphery of the insulating packing 4 and is opposed to the negative can 3. A positive electrode collector 6 is fixed on an inner surface of the positive can 5, and a positive electrode 7 is fixed on an inner surface of the positive electrode collector 6. The positive electrode 7 and the negative electrode 1 have a separator 8 therebetween, the separator 8 being formed of a polypropylene micro-cellular thin film. A cell having the above construction has a diameter of 24.0 mm and a thickness of 3.0 mm. An electrolyte is obtained by dissolving 1 mol/l of lithium perchlorate in a mixture of propylene carbonate and dimethoxyethane.

The positive electrode 7, which is the gist of this invention, was produced in the following way.

Manganese dioxide, having a specific surface area of 73.0 m$^2$/g when dry and lithium hydroxide were mixed in a mortar so that the mole ratio of the mixture be Mn:Li=70:30, thereafter the obtained mixture was heat-treated in air at 375° C. for 20 hours. The lithium-including manganese oxide obtained in this way had its specific surface area measured by the BET method, the result of which was 41.6 m$^2$/g. For the above measurement, the obtained lithium-including manganese oxide was dried at 120° C. for 40 hours (also in Embodiments II and III). It was confirmed, by observing the above lithium-including manganese oxide through an SEM (scanning electron microscope,) that grains having grain sizes of approximately 0.1 to 20 μm are distributed in the above oxide and that grains having grain sizes of larger than 20 μm were almost non-existent. The lithium-including manganese oxide as an active material, acetylene black as a conductor and a powdered fluororesin as a binder were mixed in a weight ratio of 90:6:4 to obtain a positive electrode material. The positive electrode material was pressure-molded to have a diameter of 20 mm by a force of 2 tons/cm$^2$ and then heat-treated at 250° C. to produce the positive electrode 7. The negative electrode 1 was obtained by punching a lithium plate having a specified thickness to have a diameter of 20 mm.

A cell comprising the above positive and the negative electrodes 1 and 2 is referred to as Cell A$_1$.

Example II According To This Invention

Cell A$_2$ was produced in the same method as Cell A$_1$ except that manganese dioxide having a specific surface area of 91.4 m$^2$/g was used instead of 73.0 m$^2$/g. The lithium-including manganese oxide obtained in this example had its specific surface area measured by the BET method, the result of which was 53.3 m$^2$/g.

Example III According To This Invention

Cell A$_3$ was produced in the same method as Cell A$_1$ except that manganese dioxide having a specific surface area of 37.3 m$^2$/g was used instead of 73.0 m$^2$/g. The lithium-including manganese oxide obtained in this example had its specific surface area measured by the BET method, the result of which was 17.9 m²/g.

Example IV According To This Invention

Cell $A_4$ was produced in the same method as Cell $A_1$ except that manganese dioxide having a specific surface area of 30.0 m²/g was used instead of 73.0 m²/g. The lithium-including manganese oxide obtained in this example had its specific surface area measured by the BET method, the result of which was 9.0 m²/g.

COMPARATIVE EXAMPLE I

Cell $W_1$ was produced in the same method as Cell $A_1$ except that manganese dioxide having a specific surface area of 115 m²/g was used instead of 73.0 m²/g. The lithium-including manganese oxide obtained in this example had its specific surface area measured by the BET method, the result of which was 92.4 m²/g.

COMPARATIVE EXAMPLE III

Cell $W_2$ was produced in the same method as Cell $A_1$ except that manganese dioxide having a specific surface area of 23.8 m²/g was used instead of 73.0 m²/g. The lithium-including manganese oxide obtained in this example had its specific surface area measured by the BET method, the result of which was 7.8 m²/g.

EXPERIMENT

Concerning Cells $A_1$ through $A_3$ according to this invention and Cells $W_1$ and $W_2$ as comparative examples, their initial discharge capacities and increased thicknesses after overcharged were measured. The results are shown in Table 1. The initial discharge capacity of each cell was measured by discharging the cell with a current of 3 mA until the cell voltage was declined down to 2.0V. The increased cell thickness was measured after applying a voltage of 4.0V to the cell for 30 days.

TABLE 1

| Cell | Specific surface area of $MnO_2$ (m²/g) | Specific surface area of lithium-including manganese oxide (m²/g) | Initial discharge capacity (mAh) | Increased thickness (mm) |
|---|---|---|---|---|
| $W_1$ | 115 | 92.4 | 35 | 0.45 |
| $A_2$ | 91.4 | 53.3 | 46 | 0.11 |
| $A_1$ | 73.0 | 41.6 | 45 | 0.06 |
| $A_3$ | 37.3 | 17.9 | 43 | 0.04 |
| $W_2$ | 23.8 | 7.8 | 25 | 0.02 |

As shown in Table 1, Cells $A_1$ through $A_3$ according to this invention have initial discharge capacities of 43–46 mAh and increased thicknesses of 0.04–0.11 mm. On the other hand, Cell $W_1$ as a comparative example has a smaller initial discharge capacity of 35 mAh but a larger increased thickness of 0.45 mm compared with the cells according to this invention. In the case of Cell $W_2$, the increased cell thickness is as small as 0.02 mm but the initial discharge capacity is extremely low at 25 mAh.

EMBODIMENT II

Lithium-including manganese oxides having different specific surface areas were produced with different mixture ratios of manganese dioxide and lithium hydroxide. It was confirmed through observation with an SEM that the lithium-including manganese oxide contained the same sizes of grains as in Embodiment I.

Example I According To This Invention

Cell $B_1$ was produced in the same method as Cell $A_1$ except that manganese dioxide and lithium hydroxide were mixed so that the mole ratio of the mixture be Mn:Li=80:20. The lithium-including manganese oxide obtained in this example had its specific surface area measured by the BET method, the result of which was 67.5 m²/g.

Example II According To This Invention

Cell $B_2$ was produced in the same method as Cell $A_1$ except that manganese dioxide and lithium hydroxide were mixed so that the mole ratio of the mixture be Mn:Li=50:50. The lithium-including manganese oxide obtained in this example had its specific surface area measured by the BET method, the result of which was 13.2 m²/g.

COMPARATIVE EXAMPLE I

Cell $X_1$ was produced in the same method as Cell $A_1$ except that manganese dioxide and lithium hydroxide were mixed so that the mole ratio of the mixture be Mn:Li=90:10. The lithium-including manganese oxide obtained in this example had its specific surface area measured by the BET method, the result of which was 71.5 m²/g.

COMPARATIVE EXAMPLE III

Cell $X_2$ was produced in the same method as Cell $A_1$ except that manganese dioxide and lithium hydroxide were mixed so that the mole ratio of the mixture be Mn:Li=33:67. The lithium-including manganese oxide obtained in this example had its specific surface area measured by the BET method, the result of which was 3.9 m²/g.

EXPERIMENT

Concerning Cells $B_1$ and $B_2$ and Cell $A_1$ according to this invention and Cells $X_1$ and $X_2$ as comparative examples, their initial discharge capacities and increased thicknesses after overcharged were measured. The results are shown in Table 2. The experimenting conditions were the same as those of the experiment of Embodiment I.

TABLE 2

| Cell | Mole ratio of Mn:Li | Specific surface area of lithium-including manganese oxide (m²/g) | Initial discharge capacity (mAh) | Increased thickness (mm) |
|---|---|---|---|---|
| $X_1$ | 90:10 | 71.5 | 48 | 0.30 |
| $B_1$ | 80:20 | 67.5 | 46 | 0.18 |
| $A_1$ | 70:30 | 41.6 | 45 | 0.06 |
| $B_2$ | 50:50 | 13.2 | 38 | 0.02 |
| $X_2$ | 33:67 | 3.9 | 10 | 0.01 |

As shown in Table 2, Cells $A_1$, $B_1$ and $B_2$ according to this invention have initial discharge capacities of 38–46 mAh and increased thicknesses of 0.02–0.18 mm. Cell $X_1$ as a comparative example has approximately as large an initial discharge capacity of 48 mAh as the cells according to this invention, but has a larger increased cell thickness of 0.30 mm. Cell $X_2$ has a smaller increased thickness of 0.01 mm compared with the cells of the present invention but an extremely small initial discharge capacity of 10 mAh.

EMBODIMENT III

Lithium-including manganese oxides having different specific surface areas were produced with different heat-treating temperatures of the mixture of manganese dioxide and lithium hydroxide. It was confirmed through observation with an SEM that the lithium-including manganese oxide contained the same sizes of grains as in Embodiment I.

Example I According To This Invention

Cell $C_1$ was produced in the same method as Cell $A_1$ except that manganese dioxide and lithium hydroxide were heat-treated at 300° C. The lithium-including manganese oxide obtained in this example had its specific surface area measured by the BET method, the result of which was 60.4 $m^2/g$.

Example II According To This Invention

Cell $C_2$ was produced in the same method as Cell $A_1$ except that manganese dioxide and lithium hydroxide were heat-treated at 450° C. The lithium-including manganese oxide obtained in this example had its specific surface area measured by the BET method, the result of which was 28.3 $m^2/g$.

COMPARATIVE EXAMPLE I

Cell $Y_1$ was produced in the same method as Cell $A_1$ except that manganese dioxide and lithium hydroxide were heat-treated at 250° C. The lithium-including manganese oxide obtained in this example had its specific surface area measured by the BET method, the result of which was 72.0 $m^2/g$.

COMPARATIVE EXAMPLE II

Cell $Y_2$ was produced in the same method as Cell $A_1$ except that manganese dioxide and lithium hydroxide were heat-treated at 600° C. The lithium-including manganese oxide obtained in this example had its specific surface area measured by the BET method, the result of which was 6.5 $m^2/g$.

EXPERIMENT

Concerning Cells $C_1$ and $C_2$ and Cell $A_1$ according to this invention and Cells $Y_1$ and $Y_2$ as comparative examples, their initial discharge capacities and increased thicknesses after overcharged were measured. The results are shown in Table 3. The experimenting conditions were the same as those of the experiment of Embodiment I.

TABLE 3

| Cell | Heat-treating temperature (°C.) | Specific surface area of lithium-including manganese oxide ($m^2/g$) | Initial discharge capacity (mAh) | Increased thickness (mm) |
| --- | --- | --- | --- | --- |
| $Y_1$ | 250 | 72.0 | 43 | 0.31 |
| $C_1$ | 300 | 60.4 | 44 | 0.15 |
| $A_1$ | 375 | 41.6 | 45 | 0.06 |
| $C_2$ | 430 | 28.3 | 42 | 0.05 |
| $Y_2$ | 600 | 6.5 | 13 | 0.02 |

As shown in Table 3, Cells $A_1$, $C_1$ and $C_2$ according to this invention have initial discharge capacities of 42–45 mAh and increased cell thicknesses of 0.05–0.15 mm. Cell $Y_1$ as a comparative example has approximately as large an initial discharge capacity of 43 mAh as the cells according to this invention, but has a larger increased thickness of 0.31 mm. Cell $Y_2$ has a smaller increased cell thickness of 0.02 mm compared with the cells of the present invention but an extremely small initial discharge capacity of 13 mAh.

Summary of Embodiments I through III

Summary I

Figure 2:
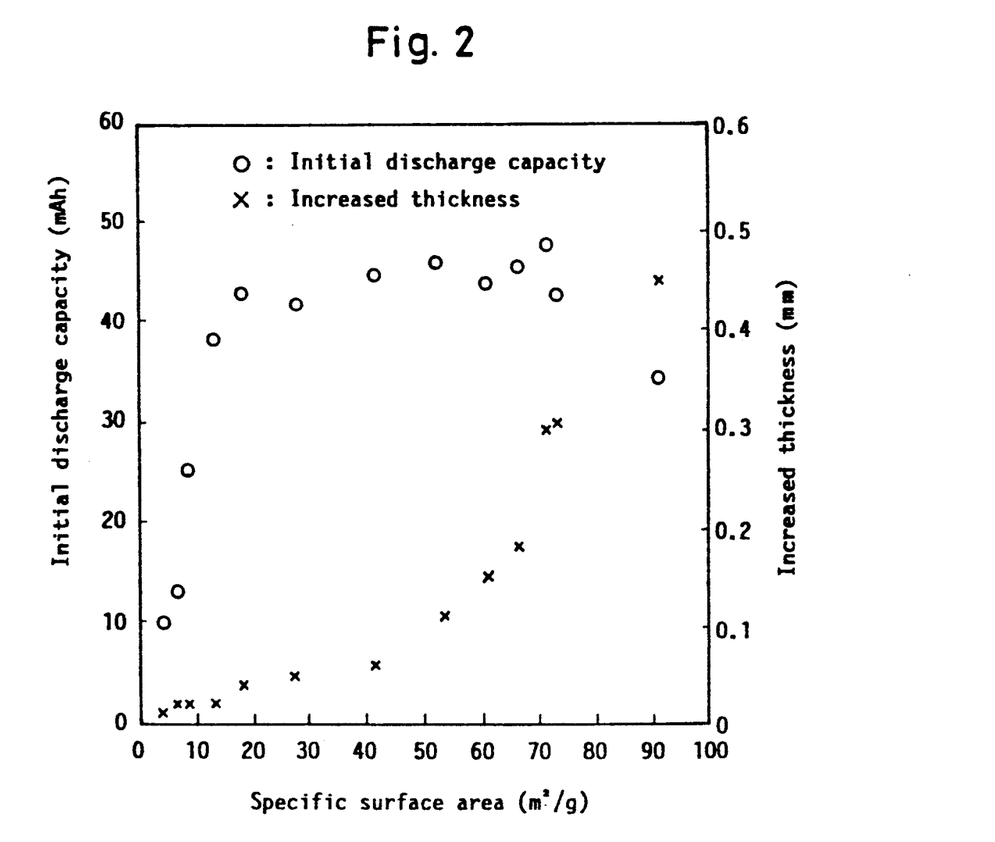
FIG. 2 is a graph showing the relationship between the specific surface area of a lithium-including manganese oxide, cell initial discharge capacity and increased cell thickness.
Figure 3:
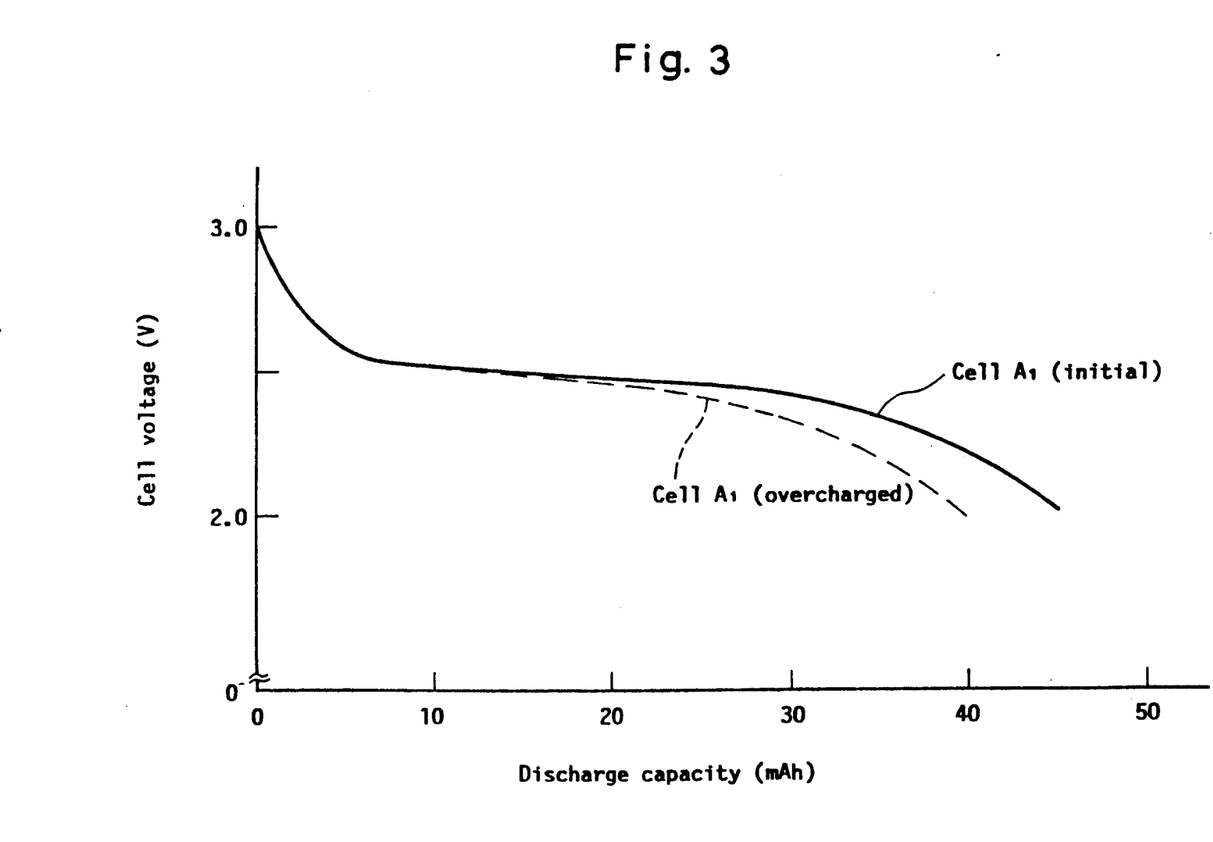
FIG. 3 is a graph showing discharge capacities of Cell A$_1$ according to this invention at an initial stage and after overcharged.
Figure 4:
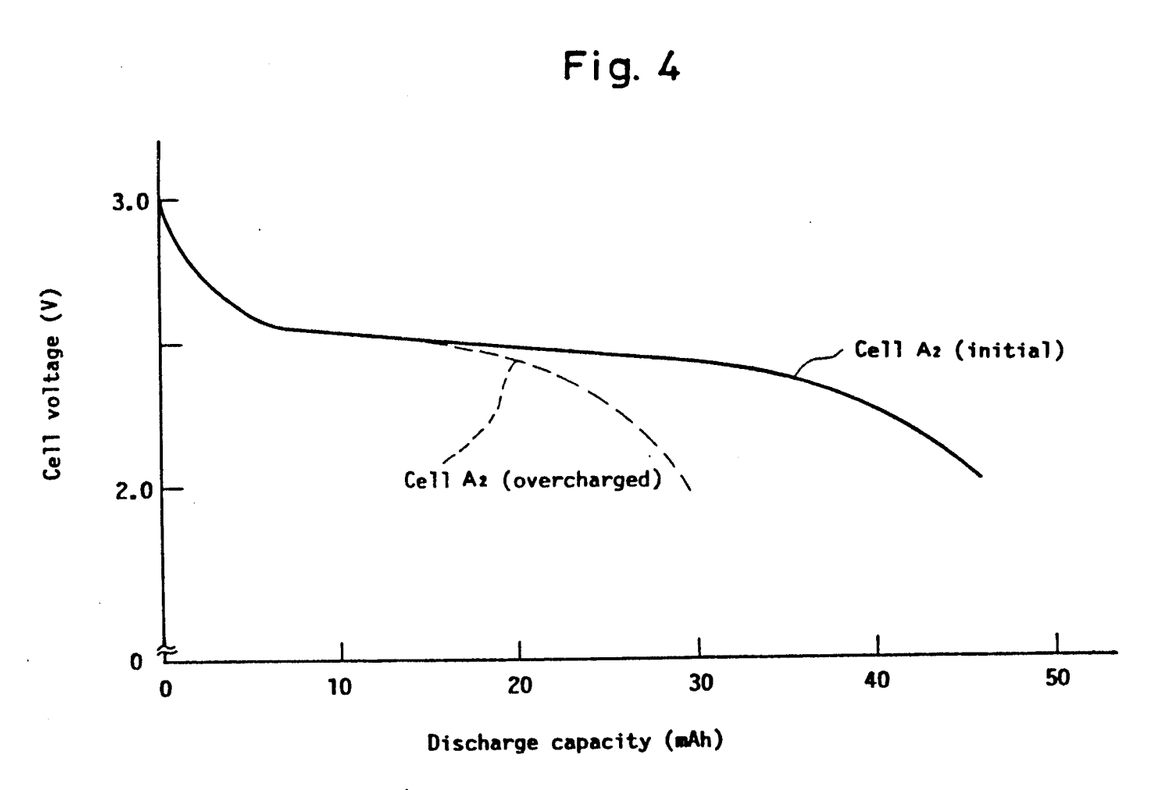
FIG. 4 is a graph showing discharge capacities of Cell A$_2$ according to this invention at an initial stage and after overcharged.
Figure 5:
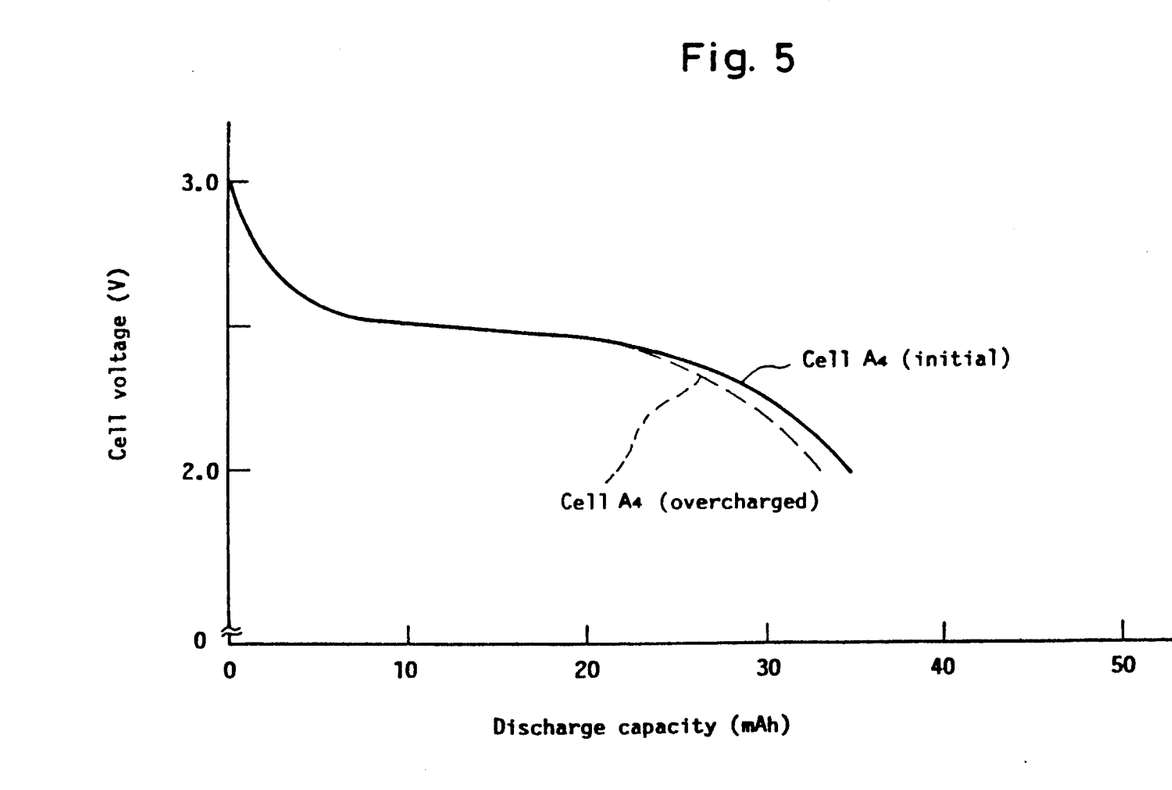
FIG. 5 is a graph showing discharge capacities of Cell A$_4$ according to this invention at an initial stage and after overcharged.
Figure 6:
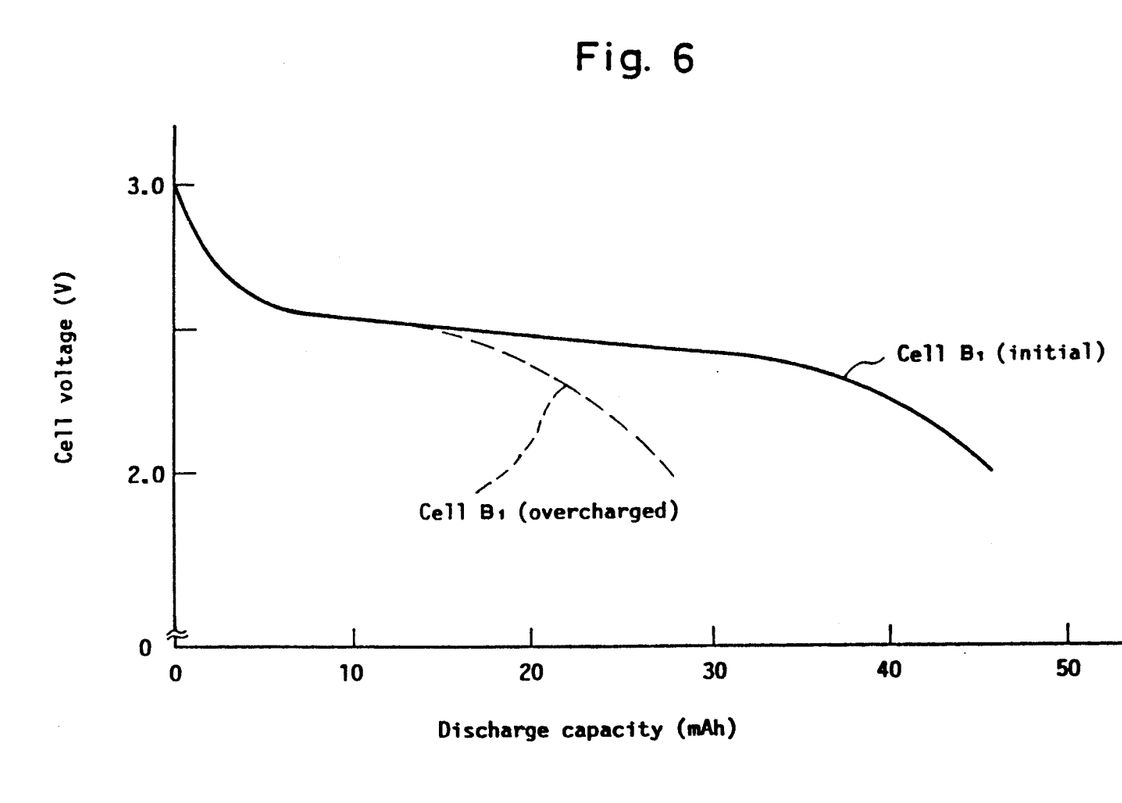
FIG. 6 is a graph showing discharge capacities of Cell B$_1$ according to this invention at an initial stage and after overcharged.
Figure 7:
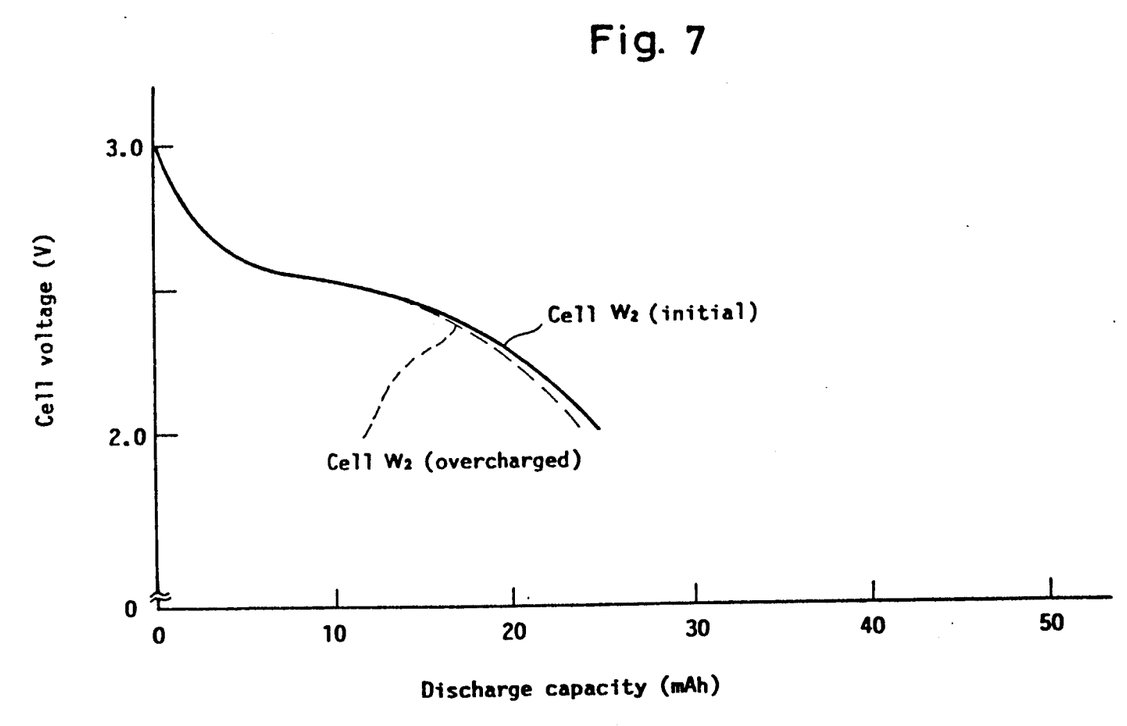
FIG. 7 is a graph showing discharge capacities of Cell W$_2$ as a comparative example at an initial stage and after overcharged.
Figure 8:
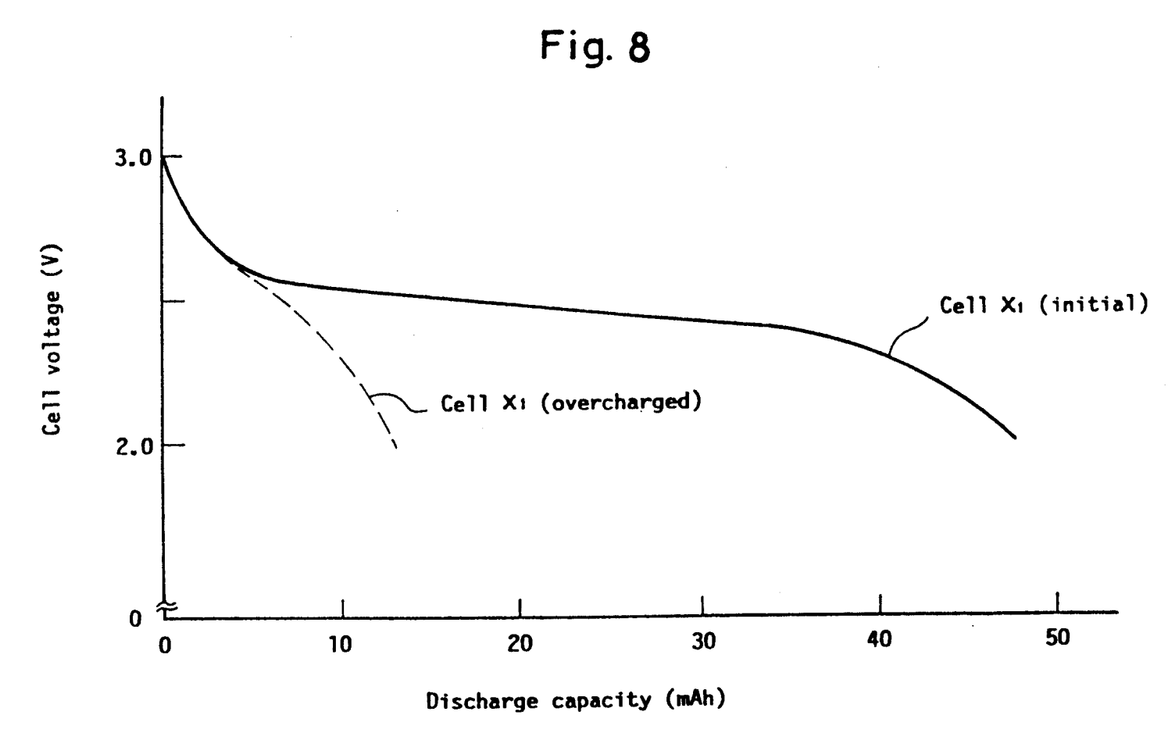
FIG. 8 is a graph showing discharge capacities of Cell X$_1$ as a comparative example at an initial stage and after overcharged.

FIG. 2 shows relationship between the initial discharge capacities, the increased thicknesses and the specific surface areas obtained by the above three embodiments.

The initial discharge capacity is drastically declined when the specific surface area of the lithium-including manganese oxide is less than 9.0 $m^2/g$. When it exceeds 41.6 $m^2/g$, the increased thickness after overcharged is gradually increased; and when it exceeds 67.5 $m^2/g$, the increased thickness is remarkably increased.

As a conclusion, the lithium-including manganese oxide used as an active material of a positive electrode of a non-aqueous secondary cell desirably has a specific surface area measured by the BET method of 9.0 $m^2/g$ to 67.5 $m^2/g$. more desirably, of 9.0 $m^2/g$ to 41.6 $m^2/g$.

The above conclusion is attributed to that too small a specific surface area of the lithium-including manganese oxide decreases a utilization of the active material, which lowers the discharge capacity and that too large a specific surface area increases a contacting area of the active material and the electrolyte, which accelerates electrolyte decomposition during overcharge.

SUMMARY III

Concerning Cells $A_1$, $A_2$, $A_4$, and $B_1$ according to this invention and Cells $W_2$ and $X_1$, their initial discharge capacities and discharge capacities after overcharged were measured. The results are shown in FIGS. 3 through 8. The experimenting conditions were the same as those of the experiment of Embodiment I.

The initial discharge capacity is drastically declined when the specific surface area of the lithium-including manganese oxide is less than 9.0 $m^2/g$ ($W_2$). The discharge capacity after overcharged is gradually declined when it exceeds 41.6 $m^2/g$ ($B_1$ and $X_1$), and is remarkably declined when it exceeds 67.5 $m^2/g$ ($X_1$).

As a conclusion, the lithium-including manganese oxide used as an active material of a positive electrode of a non-aqueous secondary cell desirably has a specific surface area measured by the BET method of 9.0 $m^2/g$ to 67.5 $m^2/g$, and more desirably, of 9.0 $m^2/g$ to 41.6 $m^2/g$.

OTHER POINTS

[1] As described in Embodiments I through III, the specific surface area of lithium-including manganese oxide depends on either the kind of manganese oxide, the mixture ratio of manganese dioxide and lithium hydroxide, or the heat-treating temperature of the mixture of manganese dioxide and lithium hydroxide, or the combination of two or all of the above.

[2] Although the above embodiments employ flat cells, the present invention can be applied to square, cylindrical and other-shaped non-aqueous secondary cells.

EMBODIMENT IV

Example I According To This Invention

The positive electrode 7 was produced by the same method as in Example I of Embodiment I except the following.

Manganese dioxide having an average grain size of 30 μm (comprising grains having grain sizes of 5 to 50 μm when observed by an SEM) and lithium hydroxide were mixed so that the mole ratio be 7:3. The mixture was done by stirring the total 50 g of the manganese dioxide and lithium hydroxide for 30 minutes with an Ishikawa stirring apparatus Type 20. Then, the obtained mixture was heat-treated at 375° C. for 20 hours to obtain lithium-including manganese oxide used as an active material. It was confirmed by observing the oxide with an SEM that grains having grain sizes of 0.1 to 20 μm were distributed in the oxide and that grains having grain sizes of larger than 20 μm were almost extinct. The specific surface area of the lithium-including manganese oxide measured by the BET method was 41.6 m²/g. The lithium-including manganese oxide as an active material, acetylene black as a conductor and fluororesin as a binder were mixed at a weight ratio of 90:6:4 to obtain a positive electrode material. The mixture was done by stirring the total 50 g of the manganese dioxide and lithium hydroxide for 5 minutes with the Ishikawa stirring apparatus Type 20. Then, the positive electrode material was pressure-molded to have a diameter of 20 mm by a force of 2 tons/cm² and heat-treated at 250° C. to produce the positive electrode 7. Observation of the positive electrode 7 by an SEM found out that the lithium-including manganese oxide comprised the grains of substantially the same sizes with those before it was mixed with the conductor and the binder.

The cell comprising the positive electrode 7 obtained above is referred to as Cell $D_1$.

Example II According To This Invention

Cell $D_2$ was produced in the same method as Cell $D_1$ except that manganese dioxide having an average grain size of 50 μm (comprising grains having grain sizes of 10 to 10 μm when observed by an SEM) was employed and that the manganese dioxide and lithium hydroxide were mixed for 2 hours to produce lithium-including manganese oxide. Observation by an SEM of the positive electrode obtained in this example confirmed that the manganese oxide comprised grains having grain sizes of 0.1 to 20 μm and that grains having sizes of larger than 20 μm were almost extinct.

Example III According To This Invention

Cell $D_3$ was produced in the same method as Cell $D_1$ except that the manganese dioxide and lithium hydroxide were mixed for 2 hours to produce a lithium-including manganese oxide. Observation by an SEM of the positive electrode obtained in this example confirmed that the manganese oxide comprised grains having grain sizes of 0.1 to 10 μm and that grains having sizes of larger than 10 μm were almost extinct.

Example IV According To This Invention

Cell $D_4$ was produced in the same method as Cell $D_1$ except that the manganese dioxide and lithium hydroxide were mixed for 10 minutes to produce a lithium-including manganese oxide and that the manganese oxide as the active material, the conductor and the binder were mixed for 30 minutes. The lithium-including manganese oxide before mixed with the conductor and the binder and the lithium-including manganese oxide in the positive electrode 7 were observed with an SEM. The former comprised grains having grain sizes of approx. 1 to 30 and 20% of the grains had grains sizes of larger than 20 μm. The latter comprised grains having grain sizes of approx. 0.1 to 20 μm and grains having grain sizes of larger than 20 μm were almost extinct.

COMPARATIVE EXAMPLE I

Cell $Z_1$ was produced in the same method as Cell $D_1$ except that the manganese dioxide and lithium hydroxide were mixed for 10 minutes to produce a lithium-including manganese oxide.

Observation by an SEM of the positive electrode obtained in this example confirmed that the manganese oxide comprised grains having grain sizes of 1 to 3.0 μm and that 20% of the grains had grain sizes of larger than 2 μm.

COMPARATIVE EXAMPLE III

Cell $Z_2$ was produced in the same method as Cell $D_2$ except that the manganese dioxide and lithium hydroxide were mixed for 30 minutes to produce a lithium-including manganese oxide. Observation by an SEM of the positive electrode obtained in this example confirmed that the manganese oxide comprised grains having grain sizes of 1 to 30 μm and that 20% of the grains had grain sizes of larger than 20 μm.

COMPARATIVE EXAMPLE III

Cell $Z_3$ was produced in the same method as Cell $D_2$ except that the manganese dioxide and lithium hydroxide were mixed for 10 minutes to produce a lithium-including manganese oxide. Observation of the positive electrode obtained in this example by an SEM confirmed that the manganese oxide comprised grains having grain sizes of 5 to 50 μm and that 50% of the grains had grain sizes of larger than 20 μm.

EXPERIMENT

Figure 9:
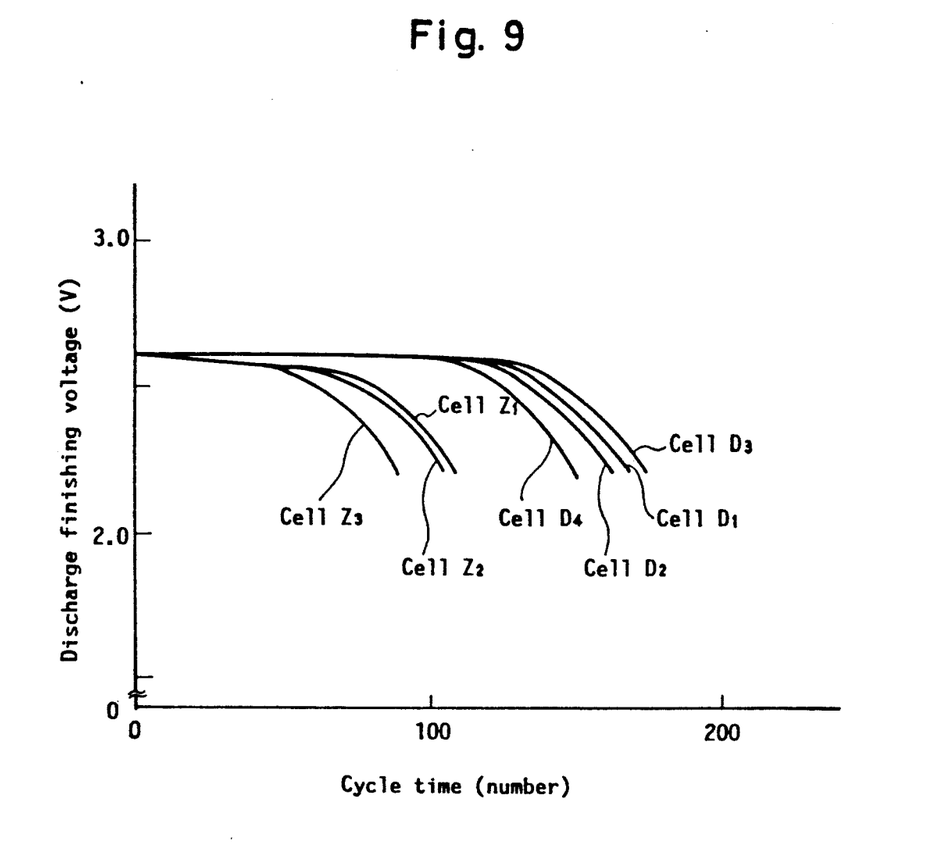
FIG. 9 is a graph showing cycle characteristics of Cells D$_1$ through D$_4$ according to this invention and Cells Z$_1$ through Z$_3$ as comparative examples.

Cycle characteristic was measured concerning Cells $D_1$ through $D_4$ according to this invention and Cells $Z_1$ through $Z_3$ as comparative examples, the results of which are shown in FIG. 9.

Cells $D_1$ through $D_4$, whose grain sizes are less than 20 μm have more excellent cycle characteristics than Cells $Z_1$ through $Z_3$, which include grains having grain sizes of more than 20 μm. Especially, $D_3$, whose grain sizes are less than 10 μm, has a remarkably excellent cycle characteristic.

Cell $D_4$ has a better cycle characteristic than Cells $Z_1$ through $Z_3$. It means there is no absolute necessity of decreasing grain sizes of the grains to less than 20 μm when the lithium-including manganese oxide is produced. It is acceptable if the grain sizes are less than 20 μm by the time the positive electrode is produced.

Cells $D_1$ through $D_4$ have excellent cycle characteristics due to change in lithium distribution, which is occurred at the heat-treating after pressure-molding.

Although Embodiment IV employs a non-aqueous secondary cell using a non-aqueous electrolyte, the present invention can also be applied to a non-aqueous secondary cell using a solid electrolyte.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A rechargeable non-aqueous secondary cell comprising:
   a negative electrode;
   a positive electrode comprising a lithium containing manganese oxide as its active material, said positive electrode having a specific surface area measured by the BET method of 9.0 m$^2$/g to 41.6 m$^2$/g; and
   a separator interposed between said positive and said negative electrodes and impregnated with a non-aqueous electrolyte.

2. A rechargeable non-aqueous secondary cell of claim 1, wherein said positive electrode is obtained by mixing manganese dioxide and lithium hydroxide, and wherein the specific surface area of said positive electrode is a function of the specific surface area of said manganese dioxide.

3. A rechargeable non-aqueous secondary cell of claim 1, wherein said positive electrode is obtained from a mixture of manganese dioxide and lithium hydroxide, and wherein the specific surface area of said positive electrode is a function of the mixing ratio of said manganese dioxide and said lithium hydroxide.

4. A rechargeable non-aqueous secondary cell of claim 1, wherein said positive electrode is obtained from a mixture of manganese dioxide and lithium hydroxide, and wherein the specific surface area of said positive electrode is a function of the temperature of heat-treating said mixture of said manganese dioxide and said lithium hydroxide.

5. A rechargeable non-aqueous secondary cell of claim 1, wherein said negative electrode comprises either of lithium and a lithium alloy.

6. A rechargeable non-aqueous secondary cell of claim 1, wherein said electrolyte comprises a mixture of propylene carbonate and dimethoxyethane containing 1 mol/l of lithium perchlorate.

7. A rechargeable non-aqueous secondary cell of claim 1, wherein said positive electrode has grain sizes of substantially 20 μm or less, when observed by a scanning electron microscope.

* * * * *

UNITED STATES PATENT AND TRADEMARK OFFICE
CERTIFICATE OF CORRECTION

PATENT NO.  : 5,294,499
DATED       : March 15, 1994
INVENTOR(S) : FURUKAWA et al.

It is certified that error appears in the above-identified patent and that said Letters Patent is hereby corrected as shown below:

On the cover page, Item [57] ABSTRACT, line 8, "recharageable" should read --rechargeable--.

Col. 2, line 51, "lowered" should read --lowered by--;
line 64, "mangane oxide" should read
--manganese dioxide--.

Col. 3, line 17, "adeptable" should read --acceptable--.

Col. 4, line 1, "maganese" should read --manganese--;
line 53, "positive" should read
--positive electrode 7--;
line 54, "electrodes 1 and 2" should read
--electrode 1--.

Col. 5, line 20, "COMPARATIVE EXAMPLE III" should read
--COMPARATIVE EXAMPLE II--.

Col. 6, line 31, "COMPARATIVE EXAMPLE III" should read
--COMPARATIVE EXAMPLE II--.

Col. 7, TABLE 3, second column, second to last row, "430" should read --450--.

UNITED STATES PATENT AND TRADEMARK OFFICE
CERTIFICATE OF CORRECTION

PATENT NO. : 5,294,499
DATED : March 15, 1994
INVENTOR(S): FURUKAWA et al.

It is certified that error appears in the above-identified patent and that said Letters Patent is hereby corrected as shown below:

Col. 8, line 35, "SUMMARY III" should read --SUMMARY II--.

Col. 9, line 44, "10" should read --100--.

Col. 10, line 18, "3.0" should read --30--;
line 20, "2" should read --20--;
line 22, "COMPARATIVE EXAMPLE III" should read --COMPARATIVE EXAMPLE II--.

Col. 11, lines 13-14, "positive electrode" should read --lithium containing manganese oxide--;
line 20, "positive electrode" should read --lithium containing manganese oxide--;
line 20, "by" should read --from--;
line 21, delete "mixing".

Col. 12, line 2, "positive electrode" should read --lithium containing manganese oxide--;
line 3, delete "a mixture of";
line 8, "positive electrode" should read --lithium containing manganese oxide--;
line 9, delete "a mixture of";

UNITED STATES PATENT AND TRADEMARK OFFICE
CERTIFICATE OF CORRECTION

PATENT NO. : 5,294,499
DATED : March 15, 1994
INVENTOR(S) : FURUKAWA et al.

It is certified that error appears in the above-indentified patent and that said Letters Patent is hereby corrected as shown below:

line 22, "positive electrode" should read --lithium containing manganese oxide--.

Signed and Sealed this

Twenty-first Day of March, 1995

Attest:

BRUCE LEHMAN

Attesting Officer

Commissioner of Patents and Trademarks